(12) United States Patent
Humphrey

(10) Patent No.: US 12,065,004 B2
(45) Date of Patent: Aug. 20, 2024

(54) HITCH MOUNTABLE WORKOUT APPARATUS

(71) Applicant: Robert Humphrey, Kurten, TX (US)

(72) Inventor: Robert Humphrey, Kurten, TX (US)

( * ) Notice: Subject to any disclaimer, the term of this patent is extended or adjusted under 35 U.S.C. 154(b) by 161 days.

(21) Appl. No.: 17/873,650

(22) Filed: Jul. 26, 2022

(65) Prior Publication Data
US 2024/0034111 A1 Feb. 1, 2024

(51) Int. Cl.
*B60D 1/02* (2006.01)
*A63B 21/00* (2006.01)
*A63B 21/068* (2006.01)
*A63B 23/12* (2006.01)
*B60R 9/06* (2006.01)

(52) U.S. Cl.
CPC ............ *B60D 1/025* (2013.01); *A63B 21/068* (2013.01); *A63B 21/4035* (2015.10); *A63B 23/1218* (2013.01); *B60R 9/06* (2013.01); *A63B 2225/093* (2013.01)

(58) Field of Classification Search
CPC ... B60D 1/025; A63B 21/068; A63B 21/4035; A63B 23/1218; A63B 2225/093; B60R 9/06
See application file for complete search history.

(56) References Cited

U.S. PATENT DOCUMENTS

| | | | | |
|---|---|---|---|---|
| 4,057,266 A * | 11/1977 | Duncan | ............... | B60D 1/40 280/475 |
| 4,516,308 A * | 5/1985 | Urban | ............... | B25H 1/16 296/24.32 |
| 5,558,608 A * | 9/1996 | Hall | ............... | A63B 21/4035 482/904 |
| 6,250,483 B1 * | 6/2001 | Frommer | ............... | A22B 5/06 452/189 |
| 6,348,028 B1 | 2/2002 | Cragg | | |
| 6,705,821 B2 * | 3/2004 | Philipps | ............... | B60P 1/5471 414/462 |
| D519,647 S * | 4/2006 | Watson | ............... | D25/62 |
| 8,485,951 B1 | 7/2013 | Adams | | |
| 9,320,934 B1 * | 4/2016 | Pringle | ............... | A63B 21/068 |
| 10,625,111 B2 * | 4/2020 | Beaver | ............... | A63B 1/00 |
| 11,857,824 B2 * | 1/2024 | Hartigan, Sr. | ............... | A63B 21/1681 |
| 2002/0134620 A1 * | 9/2002 | Meyer | ............... | B60R 9/06 182/127 |
| 2006/0186638 A1 * | 8/2006 | Varner | ............... | A63B 71/023 280/506 |
| 2007/0092362 A1 * | 4/2007 | Holt | ............... | B66C 23/44 452/187 |

(Continued)

*Primary Examiner* — Andrew S Lo

(57) ABSTRACT

A hitch mountable workout apparatus for providing a portable sturdy workout apparatus includes a hitch mount having a hitch end and a shaft end. The hitch end selectively engages a trailer hitch. A vertical main shaft has a shaft back side attached to the shaft end of the hitch mount, a shaft front side, a shaft left side, a shaft right side, a shaft top end, and a shaft bottom end. A bottom support has a support tube slidably engaged within the shaft bottom end and a support foot coupled to the support tube. The bottom support is adjustable to rest the support foot on the ground while the hitch mount is engaged with the trailer hitch. A pull-up bar has pull-up tube slidably engaged within the shaft top end, a cantilever coupled to the pull-up tube, and a crossbar coupled to the pull-up tube.

11 Claims, 4 Drawing Sheets

(56) References Cited

U.S. PATENT DOCUMENTS

| | | |
|---|---|---|
| 2007/0259764 A1 | 11/2007 | Kelly |
| 2008/0128463 A1* | 6/2008 | Bryan .............. A63B 21/00047 |
| | | 224/486 |
| 2014/0296037 A1* | 10/2014 | Razzaq .............. A63B 21/4033 |
| | | 482/99 |
| 2017/0100624 A1* | 4/2017 | Young ................ A63B 23/1218 |
| 2023/0062381 A1* | 3/2023 | Murray .............. A63B 23/1218 |

* cited by examiner

HITCH MOUNTABLE WORKOUT APPARATUS

CROSS-REFERENCE TO RELATED APPLICATIONS

Not Applicable

(c) STATEMENT REGARDING FEDERALLY SPONSORED RESEARCH OR DEVELOPMENT

Not Applicable

(d) THE NAMES OF THE PARTIES TO A JOINT RESEARCH AGREEMENT

Not Applicable

(e) INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

(f) STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to workout devices and more particularly pertains to a new workout device for providing a portable sturdy workout apparatus.

(2) DESCRIPTION OF RELATED ART INCLUDING INFORMATION DISCLOSED UNDER 37 CFR 1.97 AND 1.98

The prior art relates to workout devices that are attachable to vehicles. Existing devices mount to trailer hitches but do not include additional support and thus move with the suspension of the vehicle.

BRIEF SUMMARY OF THE INVENTION

An embodiment of the disclosure meets the needs presented above by generally comprising a hitch mount having a hitch end and a shaft end. The hitch end is configured to selectively engage a trailer hitch. A vertical main shaft has a shaft back side attached to the shaft end of the hitch mount, a shaft front side, a shaft left side, a shaft right side, a shaft top end, and a shaft bottom end. A bottom support is coupled to the main shaft. The bottom support has a support tube slidably engaged within the shaft bottom end and a support foot coupled to the support tube. The bottom support is adjustable to rest the support foot on the ground while the hitch mount is engaged with the trailer hitch. A pull-up bar is coupled to the main shaft. The pull-up bar has pull-up tube slidably engaged within the shaft top end, a cantilever coupled to the pull-up tube, and a crossbar coupled to the pull-up tube. The crossbar has at least two pull-up grip portions.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
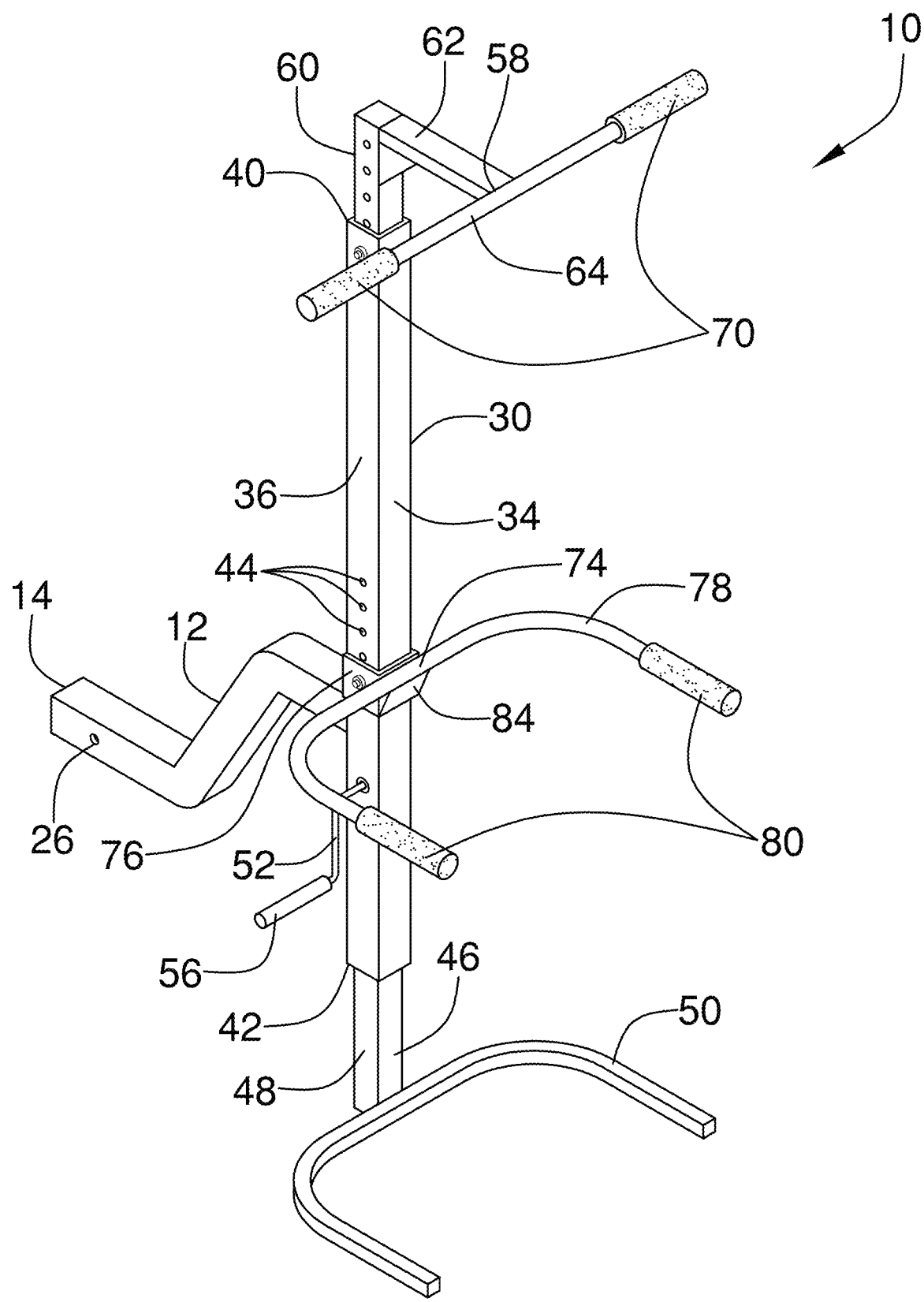
FIG. 1 is an isometric view of a hitch mountable workout apparatus according to an embodiment of the disclosure.
Figure 2:
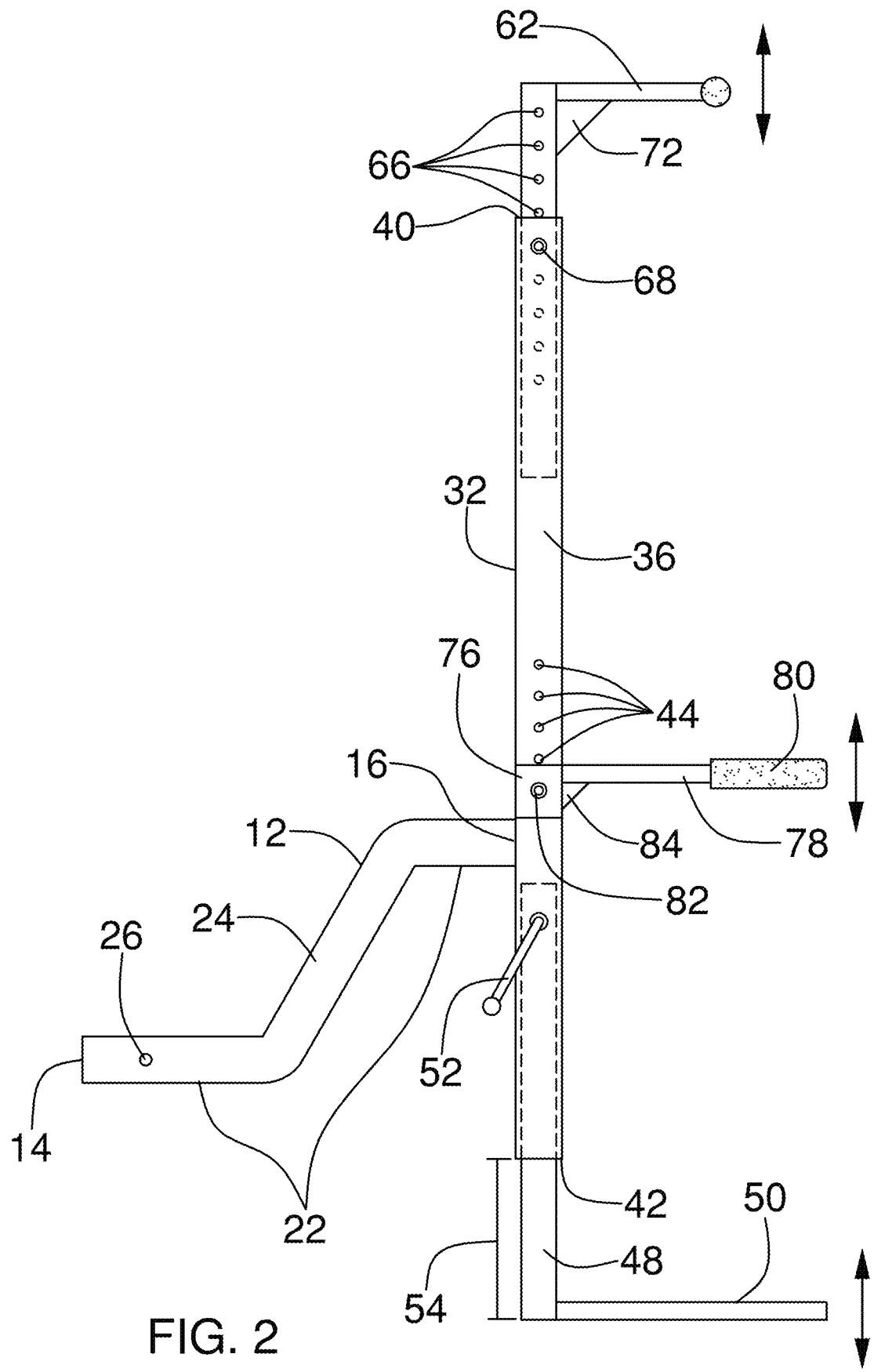
FIG. 2 is a side elevation view of an embodiment of the disclosure.
Figure 3:
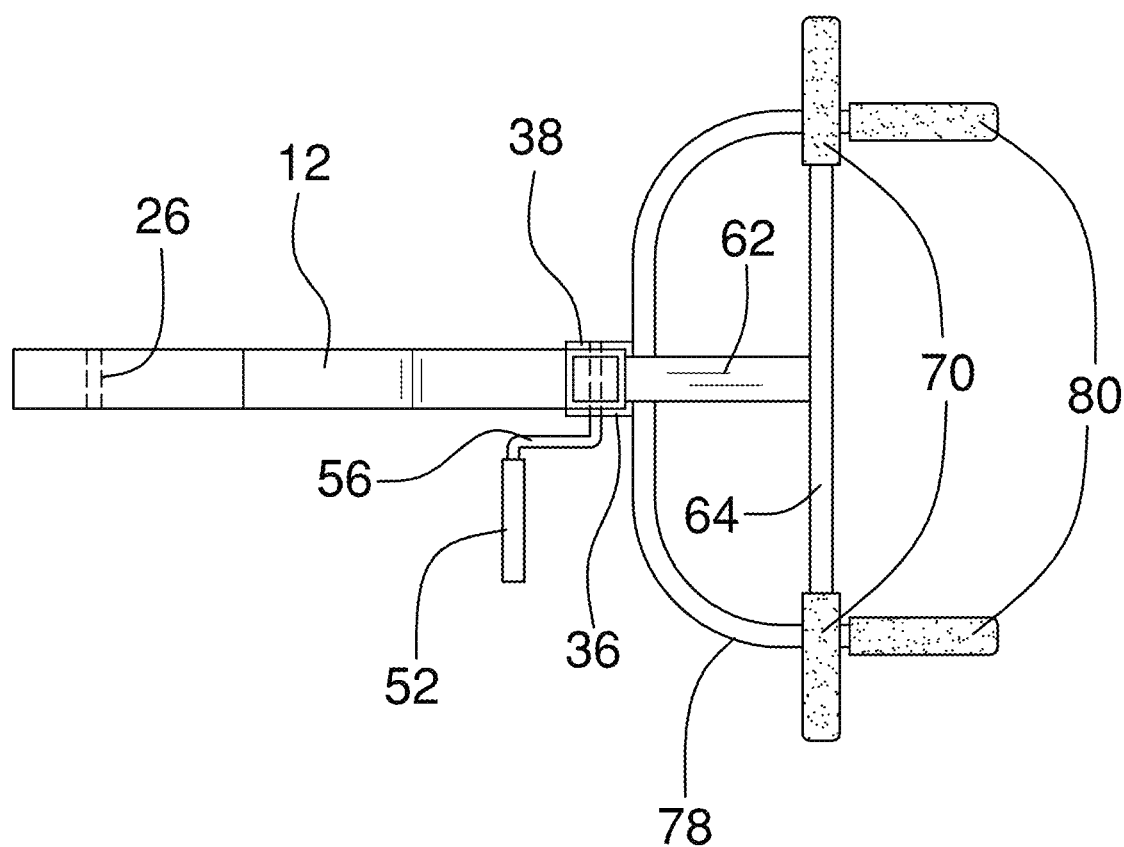
FIG. 3 is a top plan view of an embodiment of the disclosure.
Figure 4:
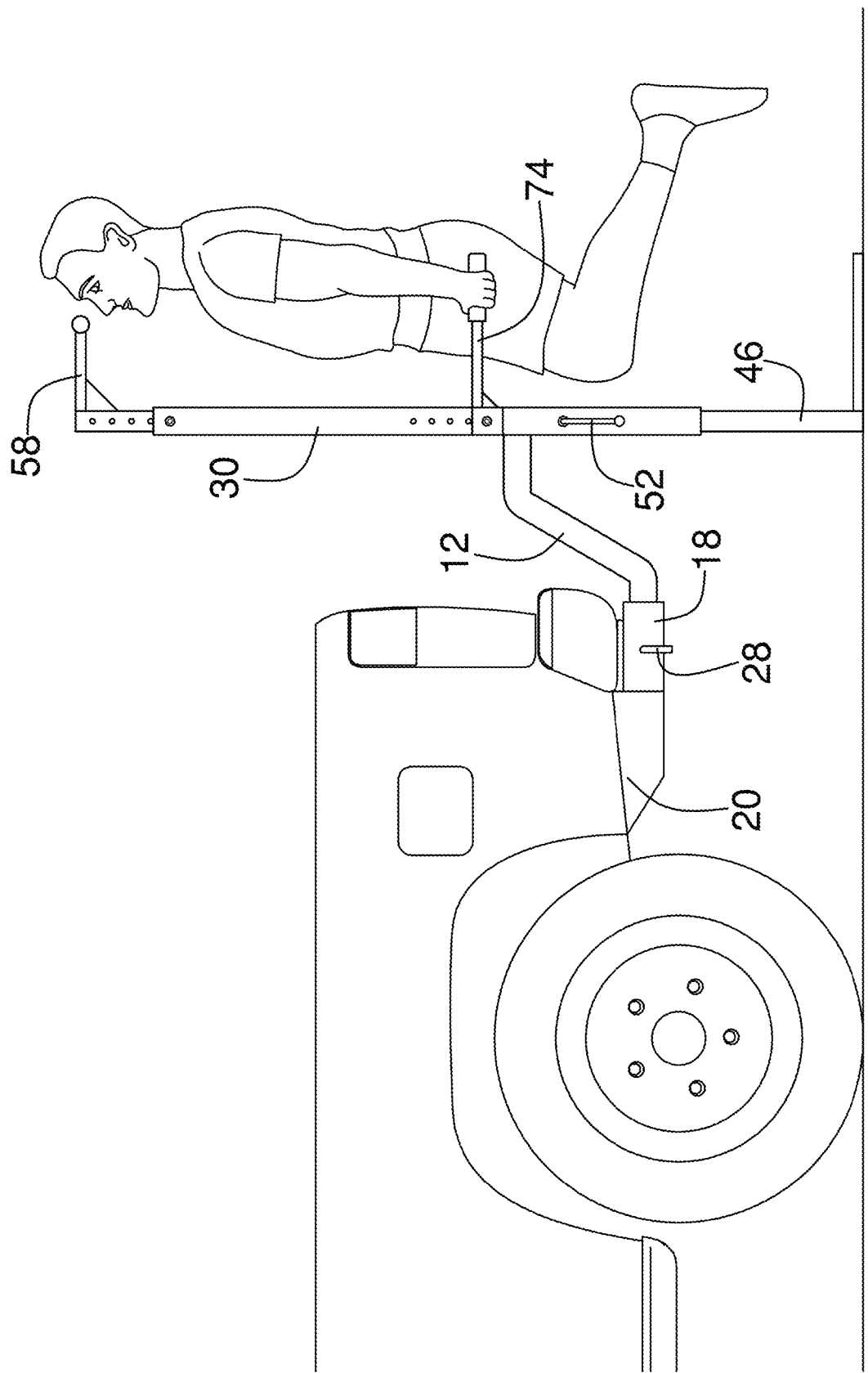
FIG. 4 is an in-use view of an embodiment of the disclosure.

With reference now to the drawings, and in particular to FIGS. 1 through 4 thereof, a new workout device embodying the principles and concepts of an embodiment of the disclosure and generally designated by the reference numeral 10 will be described.

As best illustrated in FIGS. 1 through 4, the hitch mountable workout apparatus generally comprises a hitch mount 12 having a hitch end 14 and a shaft end 16. The hitch end 14 is configured to selectively engage a trailer hitch 18 of a truck 20. The hitch mount 12 may have a pair of horizontal portions 22 and a medial angled riser portion 24. The hitch mount 12 may have a hitch mount aperture 26 proximal the hitch end 14 to receive a hitch locking pin 28.

A vertical main shaft 30 is coupled to the hitch mount 12. The main shaft 30 has a shaft back side 32, a shaft front side 34, a shaft left side 36, a shaft right side 38, a shaft top end 40, and a shaft bottom end 42. The vertical main shaft 30 may have a double spring pin locking mechanism coupled to the shaft back side 32. The double spring pin locking mechanism selectively receives the shaft end 16 of the hitch mount. A plurality of dip mounting apertures 44 extends through the shaft left side 36 and the shaft right side 38 of the main shaft. The vertical main shaft 30 may be a square tube.

A bottom support 46 is coupled to the main shaft 30. The bottom support 46 has a support tube 48 slidably engaged within the shaft bottom end 42 and a support foot 50 coupled to the support tube 48. The bottom support 46 is adjustable to rest the support foot 50 on the ground while the hitch mount 12 is engaged with the trailer hitch 18. The support foot 50 thus receives the bulk of the vertical force applied to the apparatus 10 while the hitch mount 12 serves to prevent forward-backward pitch. The apparatus 10 thus does not bounce the suspension of the truck 20. The support foot 46 may be U-shaped and extends away from the shaft front side 34 to further stabilize the apparatus. A support crank 52 may be coupled to the main shaft 12. The support crank 52 is in operational communication with the support tube 48 to mechanically adjust an extension length 54 of the support tube extending out of the shaft bottom end 42. The user can thus fully apply all weight to the bottom support 46 and may even slightly lift the trailer hitch 18. The support crank 52 may have a rotating handle portion 56.

A pull-up bar 58 is coupled to the main shaft 30. The pull-up bar 58 has a pull-up tube 60 slidably engaged within the shaft top end 40, a cantilever 62 coupled to the pull-up tube 60, and a crossbar 64 coupled to the pull-up tube 60. The pull-up tube 60 may have a plurality of pull-up mounting apertures 66 and a pull-up locking pin 68 extending through the shaft left side 36 and the shaft right side 38 to adjust the height of the pull-up bar 58. The crossbar 64 has at least two pull-up grip portions 70. Each pull-up grip portion 70 may be padded for improved user comfort. The pull-up bar 58 may have a pull-up gusset 72 coupled to the pull-up tube 60 and the cantilever 62 for structural integrity.

A dip bar 74 may be coupled to the main shaft 12. The dip bar 74 has a dip mount 76 coupled to the shaft left side 36 and the shaft right side 38 and a dip frame 78 coupled to the dip mount 76. The dip frame 78 has at least two dip grip portions 80. Each dip grip portion 80 may be padded for improved user comfort. The dip mount 76 has a dip locking pin 82 selectively engageable through the plurality of dip mounting apertures 44 to adjust the height of the dip bar 74. The dip bar 74 may have a dip gusset 84 coupled to the dip mount 76 and the dip frame 78 for structural integrity.

A pair of raise handles may be coupled to the dip frame 78 adjacent the dip grip portions 80. Each raise handle may extend perpendicularly up from the dip frame 78. A backrest may be medially coupled to the dip frame 78 to support the user's back while securing the pair of raise handles to perform leg raises. The backrest may be padded for user comfort.

A pair of pushup handles may be coupled to the support foot 50 of the bottom support. Each pushup handle may be L-shaped and has a horizontal pushup grip portion for the user to secure to do deep pushups.

In use, the hitch mount 12 is engaged with the trailer hitch 18 and the support crank 52 is used to adjust the bottom support 46 until the support foot 50 is firmly pressed against the ground. The pull-up bar 58 and the dip bar 74 are then adjusted to the desired height to provide a sturdy apparatus for various exercises.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A hitch mountable workout apparatus comprising:
   a hitch mount, the hitch mount having a hitch end and a shaft end, the hitch end being configured to selectively engage a trailer hitch;
   a vertical main shaft coupled to the hitch mount, the main shaft having a shaft back side attached to the shaft end of the hitch mount, a shaft front side, a shaft left side, a shaft right side, a shaft top end, and a shaft bottom end;
   a bottom support coupled to the main shaft, the bottom support having a support tube slidably engaged within the shaft bottom end and a support foot coupled to the support tube, the bottom support being adjustable to rest the support foot on the ground while the hitch mount is engaged with the trailer hitch; and
   a pull-up bar coupled to the main shaft, the pull-up bar having a pull-up tube slidably engaged within the shaft top end, a cantilever coupled to the pull-up tube, and a crossbar coupled to the pull-up tube, the crossbar having at least two pull-up grip portions.

2. The hitch mountable workout apparatus of claim 1 further comprising a dip bar coupled to the main shaft, the dip bar having a dip mount coupled to the shaft left side and the shaft right side and a dip frame coupled to the dip mount, the dip frame having at least two dip grip portions.

3. The hitch mountable workout apparatus of claim 2 further comprising the dip mount having a dip locking pin, the dip locking pin being selectively engageable through a plurality of dip mounting apertures extending through the shaft left side and the shaft right side of the main shaft.

4. The hitch mountable workout apparatus of claim 2 further comprising the dip bar having a dip gusset coupled to the dip mount and the dip frame.

5. The hitch mountable workout apparatus of claim 1 further comprising the support foot being U-shaped.

6. The hitch mountable workout apparatus of claim 1 further comprising a support crank coupled to the main shaft, the support crank being in operational communication with the support tube to mechanically adjust an extension length of the support tube extending out of the shaft bottom end.

7. The hitch mountable workout apparatus of claim 6 further comprising the support crank having a rotating handle portion.

8. The hitch mountable workout apparatus of claim 1 further comprising the pull-up bar having a pull-up gusset coupled to the pull-up tube and the cantilever.

9. The hitch mountable workout apparatus of claim 1 further comprising the hitch mount having a pair of horizontal portions and a medial angled riser portion.

10. The hitch mountable workout apparatus of claim 1 further comprising the pull-up tube having a plurality of pull-up mounting apertures and a pull-up locking pin extending through the shaft left side and the shaft right side.

11. A hitch mountable workout apparatus comprising:
   a hitch mount, the hitch mount having a hitch end and a shaft end, the hitch end being configured to selectively engage a trailer hitch, the hitch mount having a pair of horizontal portions and a medial angled riser portion;
   a vertical main shaft coupled to the hitch mount, the main shaft having a shaft back side, a shaft front side, a shaft left side, a shaft right side, a shaft top end, and a shaft bottom end, a plurality of dip mounting apertures extending through the shaft left side and the shaft right side of the main shaft;

a bottom support coupled to the main shaft, the bottom support having a support tube slidably engaged within the shaft bottom end and a support foot coupled to the support tube, the bottom support being adjustable to rest the support foot on the ground while the hitch mount is engaged with the trailer hitch, the support foot being U-shaped;

a support crank coupled to the main shaft, the support crank being in operational communication with the support tube to mechanically adjust an extension length of the support tube extending out of the shaft bottom end, the support crank having a rotating handle portion;

a pull-up bar coupled to the main shaft, the pull-up bar having a pull-up tube slidably engaged within the shaft top end, a cantilever coupled to the pull-up tube, and a crossbar coupled to the pull-up tube, the pull-up tube having a plurality of pull-up mounting apertures and a pull-up locking pin extending through the shaft left side and the shaft right side, the crossbar having at least two pull-up grip portions, the pull-up bar having a pull-up gusset coupled to the pull-up tube and the cantilever; and a dip bar coupled to the main shaft, the dip bar having a dip mount coupled to the shaft left side and the shaft right side and a dip frame coupled to the dip mount, the dip frame having at least two dip grip portions, the dip mount having a dip locking pin, the dip locking pin being selectively engageable through the plurality of dip mounting apertures, the dip bar having a dip gusset coupled to the dip mount and the dip frame.

* * * * *